July 28, 1953 M. D. WELSH 2,646,838
RETAINER FOR CHILDREN'S SEATS
Filed March 11, 1950

INVENTOR.
MATILDA D. WELSH
BY *John H. Cassidy*

ATTORNEY

Patented July 28, 1953

2,646,838

UNITED STATES PATENT OFFICE 2,646,838

RETAINER FOR CHILDREN'S SEATS

Matilda D. Welsh, La Due, Mo.

Application March 11, 1950, Serial No. 149,149

2 Claims. (Cl. 155—11)

This invention pertains to a child's seat and to means for securing such seat to the seat of an automobile or the like, to prevent accidental dislodgement of the child's seat.

Generally stated, this invention comprises a retainer having a pair of side arms attachable to the child's seat to extend rearward therefrom and a keeper portion at the rear, angularly disposed with respect to said arms, which keeper may be engaged behind the car seat to hold the child's seat in place.

A preferred embodiment of this invention is illustrated in the accompanying drawing in which—

Figure 1:
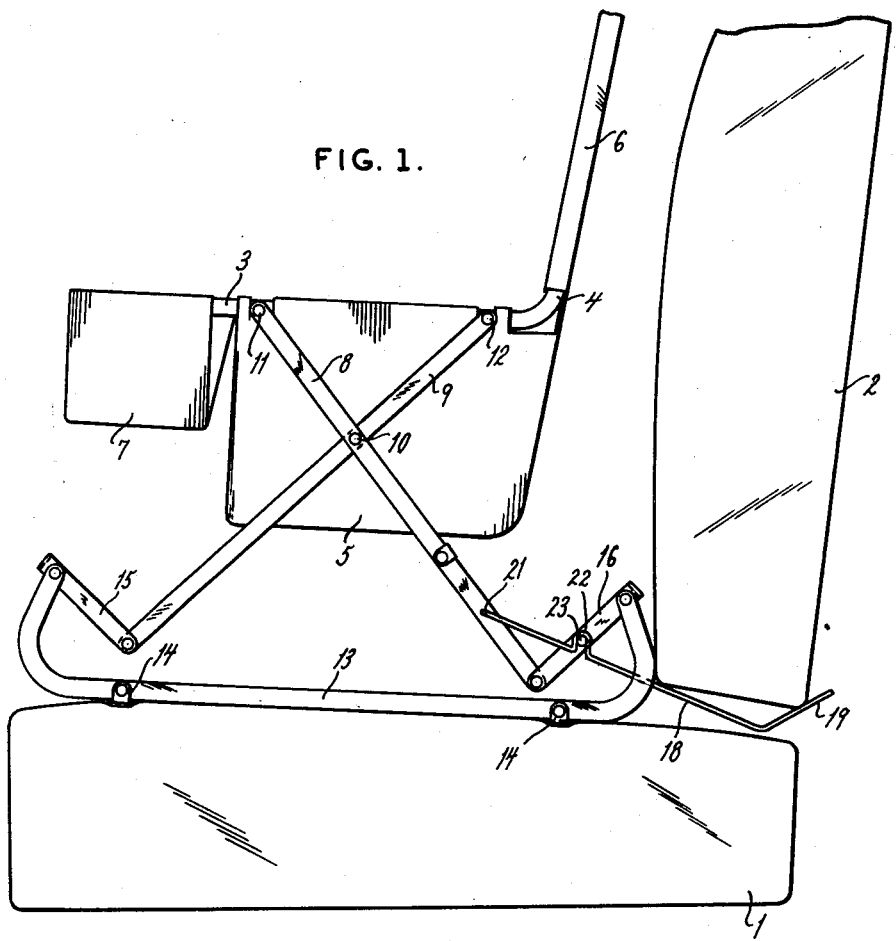
Figure 2:
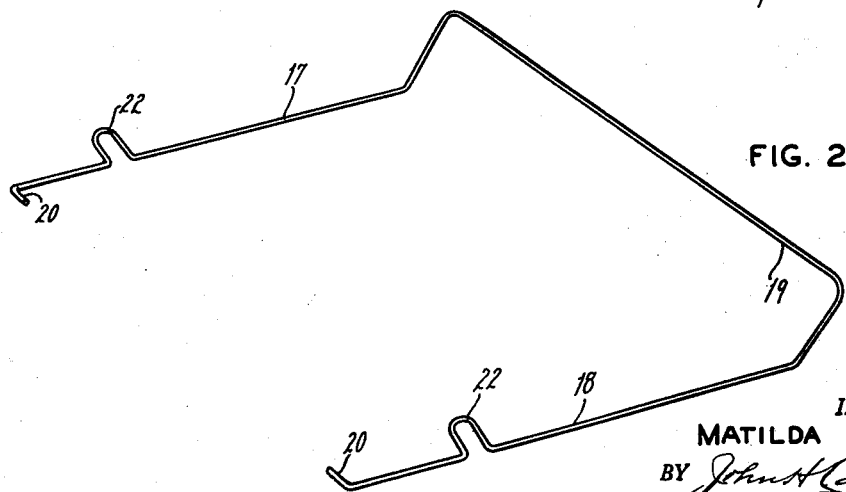

Fig. 1 is a side view of a child's seat in place on a car seat with a retainer embodying this invention securing the same; and Fig. 2 is a perspective view of the retainer.

Referring to the drawing, Fig. 1, the seat cushion is designated by 1, and 2 designates the back of any ordinary seat such as that of an automobile. The child's seat comprises a frame 3, the rear portion of which is bent upward at 4. Fig. 1 shows only one side of the seat and all the parts shown are duplicated on the opposite side. The frame 3 supports the seat 5, of suitable fabric or the like, in which the child sits, and the portion 4 similarly supports a back 6 for the seat. The portion 4 may be bowed over the top to the other side in the usual manner. The front portion of the frame 3 may also be bent laterally to pass over the other side and this portion may support a tray 7 of any desired type.

A pair of crossed legs 8 and 9 is connected together by a pin 10. These legs are connected at 11 and 12 respectively, to the frame 3 to support the latter. A base, formed by a pair of side members 13, only one of which appears in Fig. 1, connected by cross members 14, rests on the seat 1. The ends of the member 13 are bent upward as shown and the leg 9, is connected to the upturned front end thereof by a swinging link 15, while the leg 8 is similarly connected to the rear end thereof by a link 16. The child's seat is thus supported on the base 13 so that it may swing or rock slightly.

The retainer shown in Fig. 2 may be constructed of heavy wire, round, square or other shape, in cross-section, and is generally U-shaped, having side arms 17 and 18 joined at the closed end of the U by a keeper portion 19. The arms 17 and 18 lie generally in the same plane while the keeper portion 19 is bent upward at an angle to that plane. The arms 17 and 18 are each provided with connections for attachment to the frame of the child's seat at the leg 8 and the link 16. In the embodiment illustrated these connections take the form of a horizontally inturned end 20, engageable in a whole in the leg 8 as indicated at 21, and a vertically upstanding loop 22 engageable with a pin 23 on the link 16. While the arms 17 and 18 are generally parallel, it is advantageous to make them slightly converging so that they must be sprung apart to make the connections at 21 and 23. Then the resiliency of the wire will keep these connections secure.

When the retainer has been attached as described it takes the position shown in Fig. 1, extending rearward toward the back of the car seat. In this position, by lifting the child's seat, the retainer can be inserted under the back 2 of the car seat. Now when the child's seat is lowered to rest on the cushion 1 the keeper portion 19 engages behind the back 2 to prevent forward movement of the base 13. Thus the child's seat is held securely in place against displacement by sudden movements of the car. It will be noted that the connections 21 and 23 operate to lock the link 16 against swinging so that the frame becomes rigid and any danger of excessive swinging is avoided.

It will also be noted that the retainer may be arranged for use in inverted position with respect to that shown in Fig. 1, so that the keeper engages behind the cushion 1 for securing the device.

It will be obvious various changes may be made in the details of construction, within the scope of the appended claims, that parts of the invention may be used to advantage without the whole, and that additions may be made to the device while retaining all of its advantages.

I claim:

1. In combination with a child's seat having a frame, a base adapted to rest on a car seat, and a swinging suspension supporting said frame on said base, a retainer comprising a pair of side arms having connections removably attached to said frame and said suspension to lock the same against swinging, and a keeper portion connecting said arms and deflected upward with respect thereto adapted for interlocking engagement with the back of the car seat to keep said frame from sliding forward on the car seat.

2. In combination with a child's seat having a frame, a supporting base, and a suspension including a swinging link supporting said frame on said base, a retainer removably interlocked with said link and said frame to prevent relative movement thereof, said retainer having an extension formed to interlock with a car seat when said base rests on said seat to retain said base on said seat.

MATILDA D. WELSH.

References Cited in the file of this patent

UNITED STATES PATENTS

| Number | Name | Date |
|---|---|---|
| 2,252,224 | Welsh | Aug. 12, 1941 |
| 2,284,571 | Heller | May 26, 1942 |
| 2,322,403 | Van der Kieft | June 22, 1943 |
| 2,347,754 | Shay | May 2, 1944 |
| 2,365,003 | Reinholz | Dec. 12, 1944 |
| 2,446,036 | Zdanaitis | July 27, 1948 |